United States Patent
Duff

[11] Patent Number: 6,084,711
[45] Date of Patent: Jul. 4, 2000

[54] FOLDING PORTABLE LAPTOP/NOTEBOOK COMPUTER SHADE

[76] Inventor: Larry G. Duff, 4701 Tantra Dr., Boulder, Colo. 80303

[21] Appl. No.: 09/062,577

[22] Filed: Apr. 20, 1998

[51] Int. Cl.[7] .................................................. G02B 27/00
[52] U.S. Cl. ........................... 359/601; 359/612; 348/842
[58] Field of Search ..................... 359/601, 610, 359/611, 612, 613; 248/918; 348/834, 842

[56] References Cited

U.S. PATENT DOCUMENTS

| | | | |
|---|---|---|---|
| 5,115,345 | 5/1992 | Hobson et al. | 359/601 |
| 5,218,474 | 6/1993 | Kirschner | 359/601 |
| 5,233,468 | 8/1993 | McNulty | 359/601 |
| 5,237,453 | 8/1993 | Jones | 359/601 |
| 5,243,463 | 9/1993 | Waintroob | 359/601 |
| 5,325,970 | 7/1994 | Dillon et al. | 206/576 |
| 5,589,985 | 12/1996 | Heller et al. | 359/608 |
| 5,818,635 | 10/1998 | Hohn et al. | 359/612 |
| 5,877,896 | 3/1999 | Gremban | 359/601 |

*Primary Examiner*—Cassandra Spyrou
*Assistant Examiner*—Mark A. Robinson
*Attorney, Agent, or Firm*—Rick Martin; Patent Law Offices of Rick Martin, P.C.

[57] ABSTRACT

The Folding Laptop Computer Shade is a device designed to reduce the amount of ambient light adversely affecting the viewability of portable laptop/notebook computers. It is essentially a four (4) sided collapsing box, which when expanded and placed directly over the entire computer, effectively shields the display from outside light sources enough to make comfortable viewing possible. The device is of relatively simple construction, made from cloth, plastic, and other existing materials readily available. It is designed to fold flat when not in use, for easy storage in typical laptop computer cases, without the need for an extra package or a larger case. It is equipped with removable, adjustable legs for viewing and access adjustment, as well as easy storage. It consists of five (5) parts, the shade box itself, and four (4) legs.

19 Claims, 1 Drawing Sheet

Fig 1)
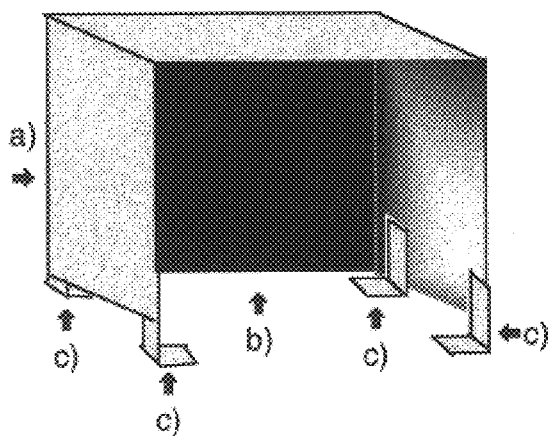
Fig 4)
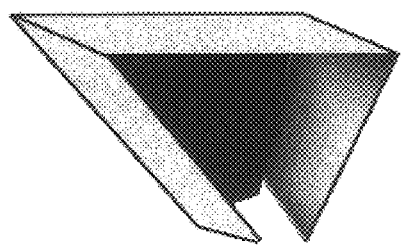
Fig 2)
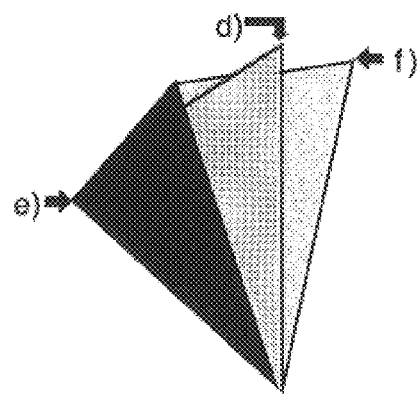
Fig 5)
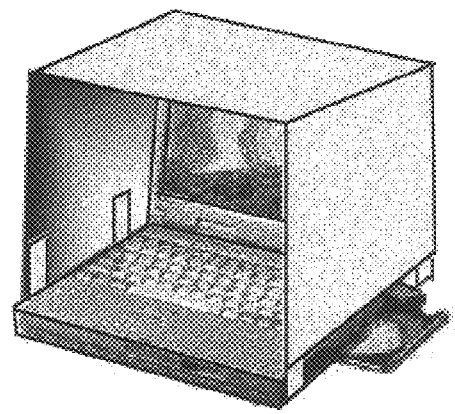
Fig 3)
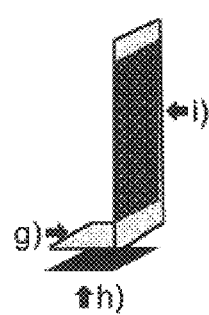

FOLDING PORTABLE LAPTOP/NOTEBOOK COMPUTER SHADE

BACKGROUND

The need for a device to shield the laptop computer's display from bright light was noticed upon taking the computer outdoors on a sunny day and seeing that the display was unreadable. Colors were nonexistent; in fact, the whole purpose of using the laptop computer was defeated, as the bright light washed out the image so badly, it was rendered impossible to view usefully. A similar effect was noticed in brightly lit indoor areas. Testing various solutions led to this shading device.

BRIEF SUMMARY

The device is a simple folding "box" with the front open, which fits over the entire computer and display unit. It may be made in whatever sizes are needed to fit different sized laptop computers. It consists of a laminated unit of two (2) types of fabric and plastic sheet. Additionally, there are four (4) legs, to allow for adjustment of viewing angle and facilitating attachment to the computer so the shade and computer may be moved as one single unit.

BRIEF DESCRIPTION OF THE DRAWINGS

FIG. 1) is a drawing of the complete laptop computer shade, unfolded, with the legs installed.

FIG. 2) is a drawing showing the exploded view of the basic structure.

FIG. 3) is a drawing of the legs for the device.

FIG. 4) is a drawing showing the device in the process of being folded.

FIG. 5) is a drawing showing the device mounted on a typical laptop computer.

DETAILED DESCRIPTION OF THE INVENTION

FIG. 1) is a drawing of the complete laptop computer shade, unfolded, with the legs installed.

a) shows that the outside fabric is a light color b) shows the inside fabric is black in color c) shows the legs, as they are attached via hook & loop fasteners to the inside fabric, which is also a female hook & loop receiver.

FIG. 2) is a drawing showing the exploded view of the basic structure, consisting of a light colored fabric laminated to a sheet of plastic on one side and a black fabric laminated to the other side of the plastic sheet.

d) shows the plastic sheet in the middle e) shows the black color fabric for the interior of the device f) shows the light color fabric for the exterior of the device FIG. 3) is a drawing of the legs for the device, which are composed of thin, rigid material, most likely plastic, and formed into an "L" shape, with rubber mounted on the bottom facing down, hook & loop fastener material on the back facing out, so the leg may be "stuck" to the inside of the device's black fabric, and a thin rubber sheet glued onto the underside (bottom of leg) for skid and marring prevention.

Not shown: at "g)" hook and loop fastener material may also be attached to the inside bottom portion of the leg, facing up, so as to connect with it's counterpart when attached to the bottom of the laptop computer if desired, to facilitate moving the two pieces as one unit. (Self-adhesive hook & loop material must be attached to the underside of the computer, separately.)

g) shows the leg itself, and the location for optional hook & loop material installation for attachment to the underside of a laptop computer h) shows the location for the rubber sheet attached to the bottom of the leg i) shows the hook and loop fastener material attached to the back of the leg FIG. 4) is a drawing showing the device in the process of being folded. Since the back is not rigid, the device may be easily folded flat for storage and/or transport.

FIG. 5) is a drawing showing the device mounted on a typical laptop computer.

The Folding Laptop/Notebook Computer Shade (FIG. 1) is a device which consists of a four (4) sided box which folds flat for storage and when unfolded, can be placed over the entire laptop computer and display. The dimensions are such that the entire computer is covered, from front to back, on both sides and the top, leaving the front open. The prototype is twelve (12) inches deep, by ten (10) inches tall, by twelve (12) inches wide. These dimensions may vary, depending upon the sizes of the exact models of computers the devices are eventually designed for. While the front is open to enable viewing and typing, the sides, top, and back are lightproof. Thus, the display is provided a good degree of shade from bright light, making it viewable in otherwise unusable circumstances where bright ambient light is present. The device also has four (4) legs which may be attached to the inside of the "box" and the computer. The legs facilitate height adjustment of the device for clearance of ports, disk drives, plugs and wires, as well as enabling proper viewing angle, and the direct attachment to the computer, itself.

The "box" consists of a layer of gray or other light colored cloth on the entire outside, with a black female hook and loop fastener material (cloth) on the entire inside. On the sides and top, there is an unseen piece of stiff sheet plastic [three (3) separate pieces of sheet plastic, one (1) for each side and one (1) for the top] glued in place between the fabrics for rigidity. (FIG. 2) There is no such plastic piece in the rear panel, so it remains flexible. The fabric is sewn together between the panels and at all edges, and is glued to the plastic sheet wherever the fabric makes contact with the plastic sheet. The fabrics are also glued to each other, forming the rear panel and the seams between the plastic sheets. There may be enough fabric material extending below the plastic on the sides and in the back to act as a "skirt" for even better light blockage. Slits in the fabrics at the rear corners near the bottom would allow the flexibility to shroud cables, etc. This "skirt" feature may not be available on all models of the device.

The legs are "L" shaped, with male hook & loop fastener material affixed to the outside side of the "L." Rubber is affixed to the outside bottom, acting as a non-slip, no-mar foot. (FIG. 3) The legs may be placed with the vertical portion attached anywhere inside the "box," as preferred for viewing height adjustment, and access to disk drives, ports, etc. Once the desired location is acquired, matching the location on the underside of the computer and installing small self-adhesive hook & and loop fastener squares to the computer's bottom there, will allow the legs to be attached to the computer by way of the hook & loop fastener's counterpart when attached to the inside of the foot (bottom) of the leg, facing upward (opposite the rubber). Mounting the legs to both the computer and the shade device allows the two to be moved as one unit and prevents wind from moving the shade. (FIG. 5) While the legs themselves are bent brass strips on the prototype, they will most likely be plastic pieces when manufactured. Each leg is six (6) inches tall vertically, by one (1) inch wide, by one eighth (1/8) inch thick, with a two (2) inch foot of the same width and thickness as the vertical portion. These dimensions may vary somewhat, depending upon the computer model each shade device is designed for.

The cloth materials are sewn together with just enough space between the plastic sheets, so that with the legs removed, the whole assembly will fold nearly completely flat, since there is no plastic sheet in the rear panel. (FIG. 4) With the legs detached, the device then folds flat and fits neatly into the average laptop computer case, along with the legs and the computer.

The "hook and loop fastener material" as described throughout, will probably be what is commonly known as Velcro™ or a permissible equivalent.

I claim:

1. An improvement for a laptop computer having a hinged screen which is viewable from a position in front of a keyboard, the improvement comprising:

a hood having opposite side members hinged to a top member;

said hood sized to enclose substantially all of the keyboard and the hinged screen; and a flexible back curtain secured to the opposing side members and the top, thereby precluding light from hitting the screen from a rear and a side angle.

2. A computer screen glare shield comprising:

a top panel;

a left and a right side panel depending from the top panel along light impervious hinges;

a flexible rear curtain having a continuous seem along a rear edge of the top panel and side panels to prevent light from passing into a space formed inside the top panel and side panels; and said top and side panels sized to fit over a screen of a laptop computer.

3. A hood comprising:

a top panel having a back edge, a left edge, and a right edge;

a left panel having a top edge hingably connected to said top panel left edge, said left panel having a bottom edge, and a back edge;

a right panel having a top edge hingably connected to said top panel right edge, said right panel having a bottom edge, and a back edge;

a flexible rear curtain having a left edge attached to said left panel back edge, a right edge attached to said right panel back edge, a top edge attached to said top panel back edge, and a bottom edge sized to reach the bottom edge of the left and right panels;

said rear curtain attachments being made such that light does not pass through said attachments; and said right panel, said left panel, said top panel, and said rear curtain being sized to overhang a laptop computer with its screen opened to a viewing angle.

4. A hood according to claim 3, wherein said top panel, said left panel, and said right panel are adopted such that said right and said left panel may each be folded flat against said top panel.

5. A hood according to claim 3, wherein said rear curtain is adopted such that said bottom edge of said rear curtain extends beyond said bottom edge of said left panel and said bottom edge of said right panel, forming a skirt which overlies cables emerging from the rear of a laptop computer placed between said left panel and said right panel.

6. A hood according to claim 3 further comprising a leg affixed to said left panel and a leg affixed to said right panel, said legs being sized to permit said left panel and said right panel to stand above a mounting surface for the laptop computer.

7. A hood according to claim 6, wherein said legs are affixed to the laptop computer residing between said left panel and said right panel.

8. A hood according to claim 6, wherein said legs are sized to provide access to a port on the laptop computer.

9. A hood according to claim 6, wherein said legs are made of metal.

10. A hood according to claim 6, wherein said legs are affixed by a hook and loop fastener.

11. A hood comprising:

a top panel having a back edge, a left edge, and a right edge, wherein said top panel has a composite structure comprising at least one cloth layer overlying a rigid material;

a left panel having a top edge hingably attached to said top panel left edge, a bottom edge, and a back edge, wherein said left panel has a composite structure comprising at least one layer or cloth overlying a rigid material;

a right panel having a top edge hingably attached to said top panel right edge, a bottom edge, and a back edge, and in which said right panel has a composite structure comprising at least one layer of cloth overlying a rigid material;

a flexible rear curtain having a left edge, a right edge, a top edge, and a bottom edge, wherein said rear curtain right edge is attached to said right panel back edge, said rear curtain left edge is attached to said left panel back edge, and said rear curtain top edge is attached to said top panel back edge;

said rear curtain attachments being made such that light does not pass through said attachments; and said rear curtain being sized to accommodate a laptop computer with its screen opened to a viewing angle and housed within a space formed between said rear curtain, said top panel, said right panel, and said left panel.

12. A hood according to claim 11, wherein said overlying cloth layer of said composite structure is fixed to said overlain rigid material.

13. A hood according to claim 11, wherein said composite structure of said left panel, said right panel, and said top panel comprises a cloth envelope into which a rigid material has been inserted.

14. A hood according to claim 13, wherein said cloth envelope comprises a piece of cloth joined to a piece of hook and loop material.

15. A hood according to claim 11 further comprising a leg affixed to said left panel and a leg affixed to said right panel, said legs being sized to permit said left panel and said right panel to stand above a surface.

16. A hood according to claim 15, wherein said legs are affixed to the laptop computer residing between said left panel and said right panel.

17. A hood according to claim 15, wherein said legs are sized to provide access to a port on the laptop computer.

18. A hood according to claim 15, wherein said legs are made of metal.

19. A hood according to claim 15, wherein said legs are affixed by a hook and loop fastener.

* * * * *